July 15, 1930. J. C. NELSON Re. 17,733

COMBINATION TIE AND SPREADER FOR CONCRETE MOLDS

Original Filed Feb. 26, 1925

Inventor
JOHN C. NELSON
By Paul, Paul & Moore
ATTORNEYS

Reissued July 15, 1930

Re. 17,733

UNITED STATES PATENT OFFICE

JOHN C. NELSON, OF LOS ANGELES, CALIFORNIA, ASSIGNOR TO NELSON SPREADER-TIE COMPANY, OF MINNEAPOLIS, MINNESOTA, A CORPORATION OF MINNESOTA

COMBINATION TIE AND SPREADER FOR CONCRETE MOLDS

Original No. 1,712,631, dated May 14, 1929, Serial No. 11,776, filed February 26, 1925. Application for reissue filed December 26, 1929. Serial No. 416,727.

This invention relates to new and useful improvements in combination ties and spreaders particularly adapted for use in the construction of concrete molds, etc., to prevent the uprights of the mold from spreading and also to provide abutments or spacers for the walls of the mold thereby to retain them in true parallel relation.

An object of the invention is to provide such a device of simple and inexpensive construction, preferably, of unitary structure and formed of sheet metal, so that they may be manufactured at a minimum cost.

A further and more specific object is to produce a combination tie and spreader constructed to provide a body portion having spacing means extending therefrom against which walls of a form or mold are adapted to abut, and straps forming continuations of the ends of the body portion adapted to be associated with supports for the form or mold to cooperate with the spacing means in tying the walls of the form or mold together in spaced relation to each other.

A further specific object is to provide a combination tie and spreader having a main body portion of angular cross-section, comprising two webs of varying lengths, the ends of one web providing abutments for the walls of the mold to prevent their collapse and the projecting ends of the other web being adapted to be secured to the mold uprights to prevent spreading.

The particular object of the invention therefore is to provide a combination tie and spreader for concrete molds.

Other objects of the invention will appear from the following description and the accompanying drawings and will be pointed out in the annexed claims.

In the drawings there has been disclosed a structure designed to carry out the various objects of the invention but it is to be understood that the invention is not confined to the exact features shown as various changes may be made within the scope of the claims which follow.

In the selected embodiment of the invention here shown, there is illustrated a portion of a concrete form or mold comprising the usual uprights 5 and the side walls 6 which are usually constructed of lumber.

Figure 1:
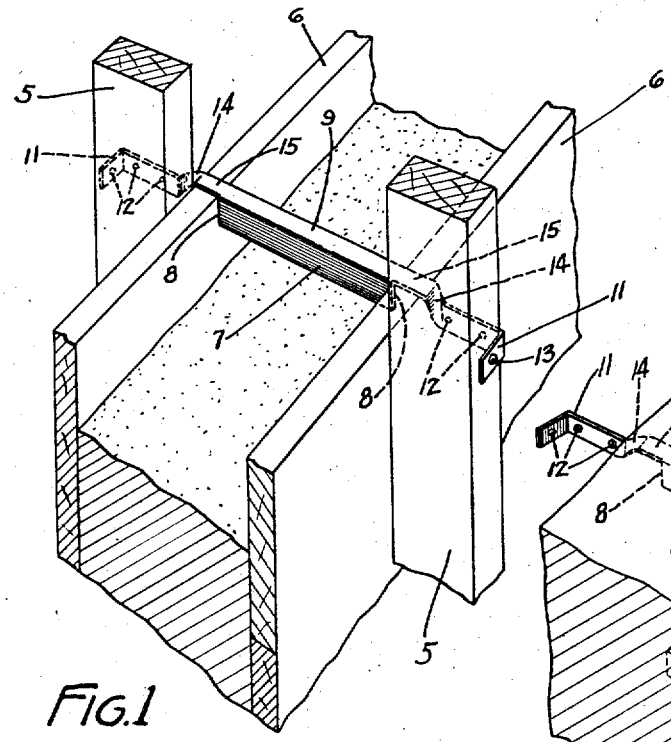
Figure 1 is a perspective view of a portion of a concrete form or mold showing the improved tie and spreader mounted thereon.
Figure 2:
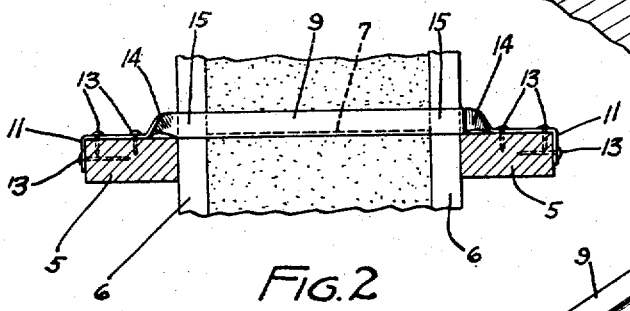
Figure 2 is a partial plan view of Figure 1 showing the preferred method of securing the device to the uprights of the mold.

The novel combination tie and spreader featured in this invention may desirably include a main body portion of angular cross-section comprising two webs of varying lengths. The relatively shorter web 7 is adapted to depend into the mold and the ends thereof provide abutments 8 adapted to engage inner upper faces of the walls of the mold to prevent such walls from collapsing. The other web 9 of the device is preferably arranged at right angles to the web 7 and is adapted to be arranged in a substantially horizontal position on the upper edges of the walls 6. As shown in Figures 1 and 2, the projecting ends 11 of the device are preferably turned at right angles with reference to the main body portion of the web so that their flat faces may engage the sides of the uprights as shown in Figure 2. Suitable apertures 12 are provided in the projecting ends 11 to receive suitable fastening means such as nails 13, shown in Figure 2. The terminals of the end-portions 11 of the web 9 may be bent around the edges of the uprights, as shown in Figure 2, in order to more securely tie the two uprights together to prevent spreading thereof, when concrete is poured into the mold.

By means of this novel device, it will readily be seen, by reference to Figures 1 and 2, that when the tie and spreader is positioned in the mold and secured to the uprights, it will be impossible for the walls of the mold to collapse and likewise it will be impossible for the uprights to spread as a result of the projecting end-portions 11 of the web 9 being secured to the sides and edges of the uprights. The abutments 8 of the depending web 7 also provide a spacing means for the opposed walls of the mold thereby to retain them in true parallel relation.

Figure 4:
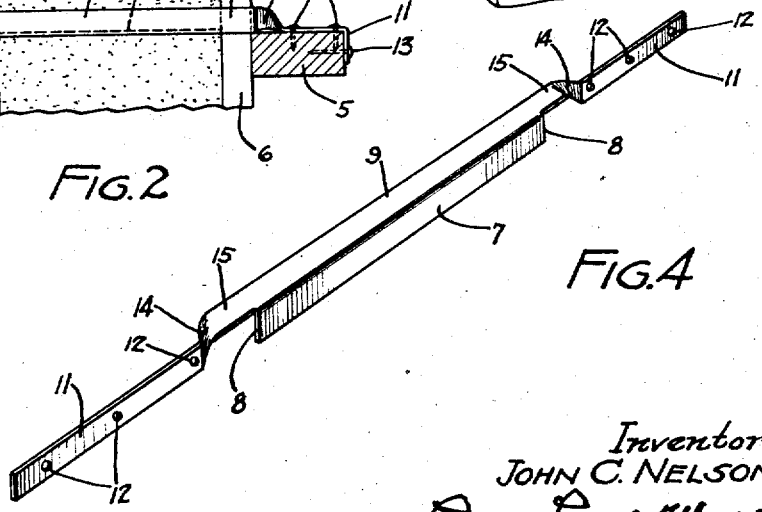
Figure 4 is a perspective view of the combination tie and spreader removed from the wall.

Referring to the drawing, particularly Figures 1 and 4, it will be noted that the turned or twisted portions 14 of the end-portion 11 are preferably spaced a distance from the abutment ends 8 of the spacing web 7, thereby providing the flat portions 15 which are adapted to engage the edges of the boards of the mold walls, as will be clearly understood by reference to Figure 1. By thus forming the end-portions 11 the boards, from which the walls of the mold are constructed may be closely fitted together so that the wall when completed, will be comparatively smooth and even.

Figure 3:
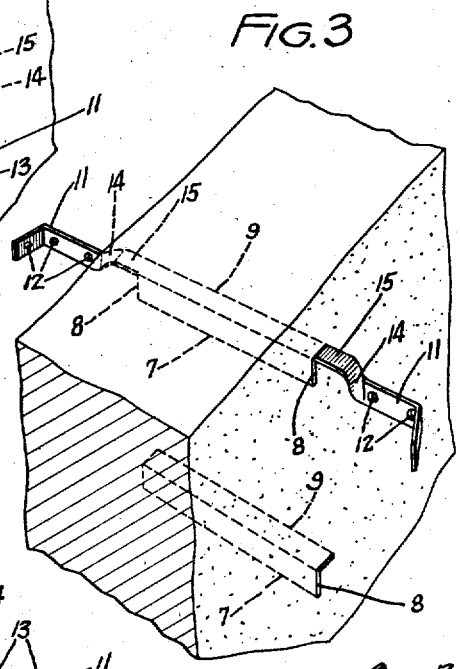
Figure 3 is a perspective view of a portion of the concrete wall with the mold removed therefrom showing the tie and spreader mounted thereon.

In the use of this novel tie and spreader, the mold will be constructed as shown in Figure 1, the walls 6 and uprights 5 being securely tied together by means of the device as hereinbefore described. After the concrete has been poured and the wall set sufficiently to permit removal of the mold, the nails 13, securing the spreader ends 11 to the uprights, will be withdrawn after which the uprights and also the walls 6 of the mold may be dissembled, thereby leaving the tie and spreader embedded in the concrete as shown in Figure 3. The projecting end-portions 11 may then be cut off by suitable means such as a pair of pliers after which the main body portion of the tie and spreader will be substantially embedded and concealed in the concrete wall, as shown in the lower portion of Figure 3.

These novel ties and spreaders are preferably made in various lengths dependent upon the size of the mold with which they are to be used, which size is determined by the thickness of the proposed wall, it being understood that the over all length of the depending web 7 will determine the inside width of the mold and therefore the thickness of the concrete wall when completed.

The construction of this device is also very simple and inexpensive as it is preferably of unitary structure and constructed of sheet metal thereby providing a device which may be manufactured at a minimum cost.

I claim as my invention:

1. A combination tie and spreader of unitary structure for concrete molds having a main body portion comprising two webs, the ends of one web providing a spacer for the mold and the projecting strap-like ends of the other web having a partial twist therein so that the flat faces of said ends may engage and partially encircle the mold uprights and be secured thereto to prevent spreading of the mold.

2. A combination tie and spreader of unitary structure for concrete molds having a body portion comprising horizontally and vertically disposed webs, the vertical web being relatively shorter and having its ends adapted to engage the inside of the mold to provide a spacer therefor, the projecting ends of the other web being twisted at right angles to the horizontal plane of said web and having their faces adapted to engage the mold uprights and said projecting ends also being apertured whereby they may be secured to the uprights to prevent spreading of the mold.

3. A combination tie and spreader for concrete molds comprising two integral webs of sheet metal, one of the webs being relatively shorter than the other and adapted to have its ends abut the oppositely positioned walls of a mold to form a spacer therefor, the end portions of the relatively longer web being adapted to extend beyond the exterior of the walls, said webs being disposed substantially at a right angle to each other so that the outwardly extending portions of the longer web may rest upon the upper edges of the walls and the shorter web may longitudinally extend between and have its ends abut said opposed walls, and each end portion of said longer web having a quarter twist therein whereby it may be engaged with a mold-upright and secured thereto.

4. In combination with a concrete form comprising side walls secured to exterior vertically arranged supports, a member formed of bendable sheet metal to provide a body portion of V-shaped cross-section including a laterally projecting spacing web against which the side walls abut to definitely space them apart, bendable straps integral with the body portion, and forming continuations of the ends of the portion, said straps extending through the side walls contiguous to the vertical supports and being bent around the supports to snugly embrace the latter, said straps having openings therethrough, and fastening members extending through the openings and driven into the supports for positively securing the straps against displacement, to thereby prevent spreading of the walls under the action of plastic concrete when poured into the form.

5. As an article of manufacture, a combined spacing and tie member formed from a single sheet of bendable metal to provide a rectangular body portion bent along a longitudinal medial line into V-shaped cross-section, straps forming continuations of the ends of the body portion at one side of the medial line so that the body portion provides at the other side of the medial line a spacing web against which the side walls of a form are adapted to abut, said straps adapted to be bent around exterior supports of the form and having openings therein through which fastening members are adapted to be extended to secure the straps to the supports.

6. As an article of manufacture, a combined spacing and tie member constructed to provide a strip having a spacing web projecting laterally from its central portion and bent along a longitudinal line so that the central portion is angular in cross-section, the end portions of the strip providing bendable straps adapted to be bent around supports of a concrete form so as to co-operate with said web in tying the walls together in definite spaced relation.

7. As an article of manufacture, a combined spacing and tie member constructed to provide a body portion having a laterally projecting spacing web against the ends of which walls of a concrete form are adapted to abut, and bendable straps forming continuations of the ends of the body portion adapted to be bent around exterior supports of the form so as to cooperate with said web in tying the walls of the form together in definite spaced relation.

8. As an article of manufacture, a combined spacing and tie member constructed to provide a body portion, means on said body portion adapted to be inserted between walls of a concrete form in abutting relation thereto to space said walls apart, and straps forming continuations of the ends of said body portion twisted relatively thereto and adapted to be fastened to exterior supports of the form to cooperate with said spacing means in tying the walls of the form together in definite spaced relation.

9. A combination tie and spreader comprising a body portion, means on said body portion adapted to be inserted between walls of a concrete form in abutting relation thereto to space said walls apart, and straps forming continuations of the ends of said body portion adapted to be bent about and fitted against exterior supports for the walls of the form to cooperate with said spacing means in fixing said walls of the form between external supports thereof and said spacing means, whereby to tie the walls of the form together in definite spaced relation.

10. As an article of manufacture, a combined spacing and tie member constructed to provide a body portion having spaced apart surfaces adapted to engage edges of spaced apart walls of a concrete form, means on said body portion adapted to be inserted between said walls in abutting relation thereto, and straps forming continuations of the ends of said body portion, there being a twist between each strap and said body portion to bring portions of the straps into engagement with exterior supports of the form, and said straps being adapted to retain said exterior supports in holding relation against the outer faces of the walls of the form to thus cooperate with the spacing means to tie the walls of the form together in definite spaced relation.

11. As an article of manufacture, a combined spacing and tie member constructed to provide a body portion having spaced apart, relatively flat surfaces adapted to lie against edges of spaced apart walls of a concrete form, means on said body portion adapted to be inserted between said walls in abutting relation thereto, and straps forming continuations of the ends of said body portion adapted to be bent around exterior supports of the form to cooperate with said spacing means in tying the walls of the form together in definite spaced relation.

12. As an article of manufacture, a combined spacing and tie member constructed to provide a body portion having spaced apart, relatively flat surfaces adapted to lie against edges of spaced apart walls of a concrete form, means on said body portion adapted to be inserted between said walls in abutting relation thereto, and straps forming continuations of the ends of said body portion, there being a twist at the location where each strap joins said body portion to bring a relatively flat surface of each strap into engagement with an exterior support of said form, and said straps being adapted to be fitted to exterior supports of the form to retain said exterior supports in holding relation against the outer faces of the walls of the form to thus cooperate with the spacing means to tie the walls of the form together in definite spaced relation.

13. As an article of manufacture, a combined spacing and tie member constructed to provide a body portion, means on said body portion adapted to be inserted between walls of a concrete form in abutting relation thereto to space said walls apart, and means cooperating with said spacing means to tie the walls of the form together in definite spaced relation, said last mentioned means including a strap forming a continuation of an end of said body portion twisted relatively thereto and adapted to be fastened to an exterior support of the form.

14. As an article of manufacture, a combined spacing and tie member constructed to provide a body portion, means on said body portion adapted to be inserted between walls of a concrete form in abutting relation thereto to space said walls apart, and means cooperating with said spacing means to tie the walls of the form together in definite spaced relation, said last mentioned means including a strap forming a continuation of an end of said body portion and twisted relatively thereto, the strap being formed of a bendable metal adapted to be shaped substantially to fit around an exterior support for a wall of the form.

15. As an article of manufacture, a combined spacing and tie member comprising a strip of material providing the body portion of said member, means on said strip adapted to be inserted between walls of a concrete form in abutting relation thereto to space said walls apart, and means cooperating with said spacing means to tie the walls of the form together in spaced relation, said last mentioned means including a strap integral with said strip and twisted relatively thereto.

In witness whereof, I have hereunto set my hand, this 16th day of December, 1929.

JOHN C. NELSON.